(12) United States Patent
Yang et al.

(10) Patent No.: US 10,713,500 B2
(45) Date of Patent: Jul. 14, 2020

(54) IDENTIFICATION AND CLASSIFICATION OF TRAFFIC CONFLICTS USING LIVE VIDEO IMAGES

(71) Applicant: Kennesaw State University Research and Service Foundation, Inc., Kennesaw, GA (US)

(72) Inventors: Jidong J. Yang, John Creek, GA (US); Ying Wang, Marietta, GA (US); Chih-Cheng Hung, Marietta, GA (US)

(73) Assignee: Kennesaw State University Research and Service Foundation, Inc., Kennesaw, GA (US)

( * ) Notice: Subject to any disclaimer, the term of this patent is extended or adjusted under 35 U.S.C. 154(b) by 150 days.

(21) Appl. No.: 15/700,962

(22) Filed: Sep. 11, 2017

(65) Prior Publication Data
US 2018/0089515 A1  Mar. 29, 2018

Related U.S. Application Data

(60) Provisional application No. 62/393,467, filed on Sep. 12, 2016.

(51) Int. Cl.
*G06K 9/00* (2006.01)
*G06K 9/78* (2006.01)
(Continued)

(52) U.S. Cl.
CPC ....... *G06K 9/00785* (2013.01); *G06K 9/6256* (2013.01); *G06K 9/6274* (2013.01); *G06K 9/6277* (2013.01); *G06K 9/78* (2013.01); *G06T 7/248* (2017.01); *G06T 7/254* (2017.01); *G06T 7/80* (2017.01); *G06K 9/6272* (2013.01);
(Continued)

(58) Field of Classification Search
CPC .. G06K 9/00805; G06K 9/00201; G06K 9/46; G06K 9/4628; G06K 9/627; G06K 9/3241; G06K 9/00785; G06K 9/6256; G06K 9/6274; G06K 9/6277; G06K 9/78; B60Q 9/008; G06N 3/04; G06N 3/08; G06N 99/00; B60W 30/095; B60W 50/14; B60W 40/04; G06F 17/30241; A61B 5/18;
(Continued)

(56) References Cited

U.S. PATENT DOCUMENTS

2008/0040023 A1  2/2008  Breed et al.
2011/0071750 A1  3/2011  Giovino et al.
(Continued)

FOREIGN PATENT DOCUMENTS

| CN | 103236191 A | 8/2013 |
| WO | 2014/020315 A1 | 2/2014 |
| WO | 2015/188905 A1 | 12/2015 |

*Primary Examiner* — Duy M Dang
(74) *Attorney, Agent, or Firm* — Smith, Gambrell & Russell LLP

(57) ABSTRACT

A practical method and system for transportation agencies (federal, state, and local) to monitor and assess the safety of their roadway networks in real time based on traffic conflict events such that corrective actions can be proactively undertaken to keep their roadway systems safe for travelling public. The method and system also provides a tool for evaluating the performance of autonomous vehicle/self-driving car technologies with respect to safety and efficiency.

19 Claims, 9 Drawing Sheets
(8 of 9 Drawing Sheet(s) Filed in Color)

(51) Int. Cl.
  *G06T 7/246* (2017.01)
  *G06K 9/62* (2006.01)
  *G06T 7/80* (2017.01)
  *G06T 7/254* (2017.01)

(52) U.S. Cl.
  CPC   *G06T 2200/08* (2013.01); *G06T 2207/10016* (2013.01); *G06T 2207/30236* (2013.01); *G06T 2207/30241* (2013.01)

(58) Field of Classification Search
  CPC ..... B60R 21/01538; G06T 7/80; G06T 7/254; G06T 7/248
  See application file for complete search history.

(56)  References Cited

U.S. PATENT DOCUMENTS

| | | | |
|---|---|---|---|
| 2012/0306663 A1* | 12/2012 | Mudalige | G08G 1/163 340/903 |
| 2014/0012492 A1* | 1/2014 | Bowers | G08G 1/16 701/301 |
| 2014/0372016 A1 | 12/2014 | Buchholz et al. | |
| 2015/0365664 A1 | 12/2015 | Yousefi et al. | |
| 2016/0260328 A1 | 9/2016 | Mishra et al. | |
| 2017/0053169 A1 | 2/2017 | Cuban et al. | |
| 2017/0154241 A1 | 6/2017 | Shambik et al. | |
| 2017/0177937 A1 | 6/2017 | Harmsen et al. | |
| 2017/0206238 A1 | 6/2017 | Coutinho et al. | |
| 2018/0151072 A1 | 5/2018 | Altinger et al. | |
| 2018/0212684 A1 | 6/2018 | Aoyama et al. | |
| 2018/0239982 A1 | 8/2018 | Rutschman et al. | |

\* cited by examiner

IDENTIFICATION AND CLASSIFICATION OF TRAFFIC CONFLICTS USING LIVE VIDEO IMAGES

This application claims priority to U.S. Ser. No. 62/393,467 filed Sep. 12, 2016, which is expressly incorporated by reference herein in its entirety.

Regardless of safety aspects considered by engineers as part of the roadway design and traffic operations, crashes continue to occur. New technologies (e.g., connected vehicles and autonomous vehicles) aiming to simplify driving tasks or remove human factors are expected to dramatically improve highway safety, but likely have implications that are not fully understood until they have been implemented for a certain period of time. For example, vehicle navigation systems help drivers with efficient routing, but pose a distraction concern. Almost any changes in any aspects of roadways, traffic operations and control, vehicle technologies, and driver behaviors will likely have a safety implication. Thus, proactively monitoring and continuous assessment of traffic safety are essential to ensure safe travel environment for all road users.

Current practices monitor and evaluate traffic safety based on crashes occurred, which is passive in nature. Historical crash data (post-event data) is typically analyzed at an aggregate (macroscopic) level and generally lacks granular, time-variant information pertaining to each crash occurrence. Because crashes are rare events, this traditional approach is ineffective and cannot be applied in a timely manner, leaving many dangerous locations undetected until after a significant number of crashes have already occurred. Instead of relying on actual crash data, which takes a long time to accumulate, more recent approaches use surrogate measures for crashes, such as "conflict". Conflict indicates "potential" crash and can be observed in the field by way of avoidance behaviors, such as sudden braking or lane change.

Conflicts take much less time to gather than crashes so that safety assessment can be conducted based on conflicts in a timely fashion. It allows for proactive assessment and help to reveal safety concerns or deficiencies before actual crashes occur.

Unlike crash data, which is typically entered by a police officer in a crash database during the crash scene investigation, conflict events, being evasive and inconsequent, are rarely reported. Field conflict studies can be conducted by trained personnel; however, doing so is labor intensive and can put observers in dangerous situations. Currently there are no automatic ways to systematically capture and log conflict events. Instead, surrogate safety assessment models have been used to analyze the frequency and characters of narrowly avelied vehicle-to-vehicle collisions. Such models allow for an expedited safety assessment, but rely on micro-simulation to predict vehicle trajectories, which is computationally demanding, can be of questionable accuracy, and is not well suited for real-time applications.

The inventive disclosed system capitalizes upon richer, conflict event data to effectively improve road safety. It uses applied artificial intelligence, acquired through proper "training" procedures inspired by the fact that a "true" conflict can be easily discerned by human eyes (similar to conducting a field conflict study by trained personnel), to identify and classify various conflict events. After being successfully trained, the system can function like a trained person and is able to continuously and consistently watch for and detect various conflict events exhibited in live images from one or more image capture devices such as cameras that are installed at certain height to monitor live traffic. The existing Closed-Circuit Television (CCTV) cameras, or vehicle detection cameras currently used by public agencies for traffic monitoring, control and management may be used for this purpose. As a result, the system provides an invaluable tool to automatically and continuously monitor and assess traffic safety on roadway networks in real time. By doing so, any potential deficiencies or opportunities for improvement in geometric features, e.g., adding a turn lane, offsetting opposing left turn lanes, flattening horizontal or vertical curves, adding street lighting, etc., or traffic controls, e.g., using protected-only left turn phase, using split phases, adjusting yellow clearance and all-red times, adding advance warning signs, installing raised pavement markers, etc., can be timely discerned and implemented before actual crashes occur. Given its proactive nature, the system is expected to considerably reduce the number of crashes that could have occurred otherwise.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 1:
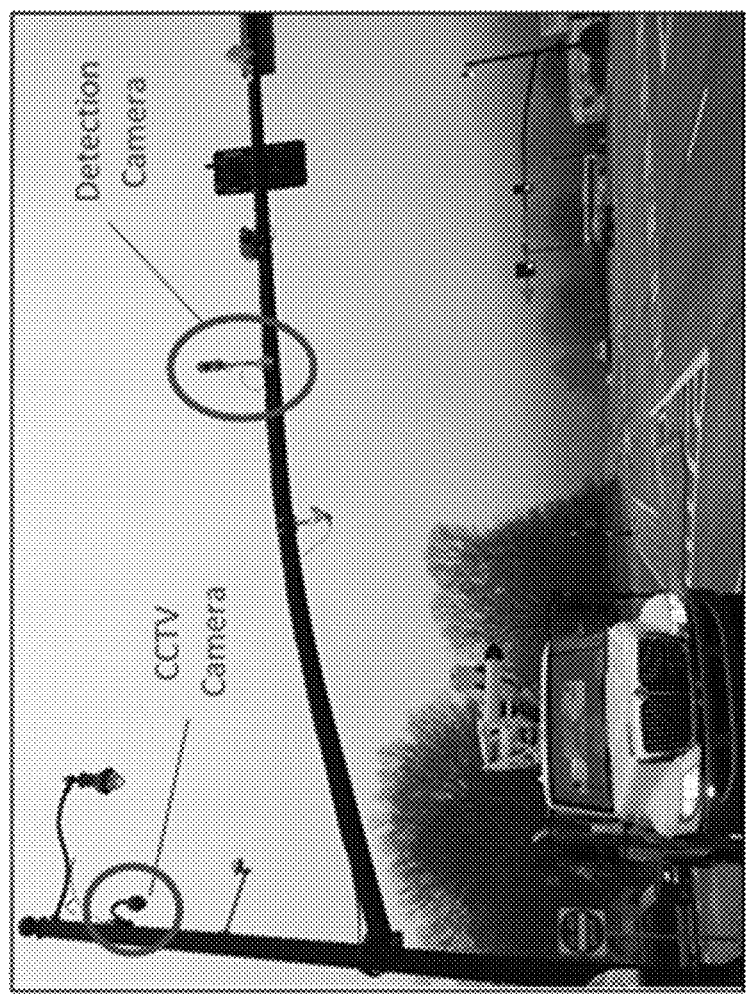
FIG. 1 shows an exemplary intersection camera installation, including a CCTV camera for traffic monitoring and a vehicle detection camera for actuated traffic signal operations.
Figure 2A:
FIGS. 2A and 2B show results of detection and classification of road users using You Only Look Once (YOLO) real time detection system.
Figure 2B:

The system obtains live or streaming video feeds from camera(s) as inputs and processes them in real time to identify, classify, and log various traffic conflict events. The camera(s) should be mounted high enough to be able to "see" all road users (e.g., vehicles, bicycles, pedestrians, etc.). Partial or temporary occlusion may be allowed. Existing roadway cameras (CCTV or vehicle detection cameras, such as shown in FIG. 1) could be used for this purpose. The system includes a central processor unit (CPU) together with one or more graphics processing units (GPU) for real-time image processing, a storage device to log detected conflict events, and a communication port to transmit conflict event data to a remote or cloud database server. The processes or steps are as follows:

Step 1. Detect and track moving objects (e.g. vehicles, bicycles, pedestrians, etc.) in the camera view. Detection and tracking are accomplished through known image processing techniques or algorithms (e.g., traditional background subtraction and/or frame difference, or the state-of-the-art You Only Look Once (YOLO) real-time detection system). FIGS. 2A and 2B show results of using YOLO for objects (e.g., vehicles) detection and classification based on live images from an existing CCTV camera. The boxes indicate detection. The different colors of boxes indicate different classes of vehicles and the number on each box is the probability or likelihood for that vehicle class.

Figure 3:
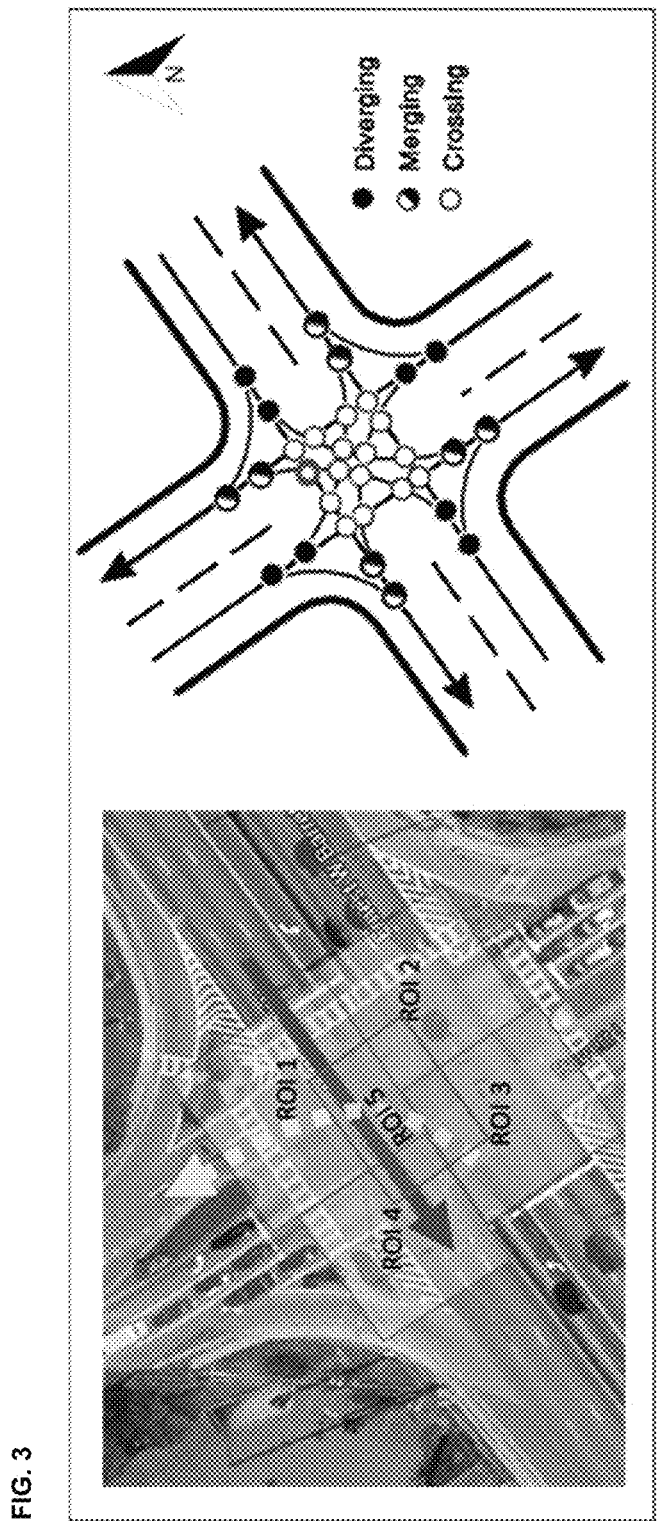
FIG. 3 is a schematic diagram of an exemplary four-leg signalized intersection and potential conflicts, also showing symbolically represented movements for a conflict between a northeastbound left turn and opposing southwestbound through movement; note the intersection allows a permissive left turn phase.

Step 2. Transform or project the detected moving objects to a two dimensional (2D) top-down view, as shown in FIG. 3 (Image I-Image 2). Some implementations may transform the perspective of a camera view using a mathematical model. Others may use an actual top-down view for the same location from other sources (e.g., high resolution satellite imagery or aerial vehicle mounted camera). For the former, video image frames are georeferenced with respect to four (4) ground reference points, which need to be visible in the camera view. Through those reference points, a perspective transformation model is applied to transform the image coordinate system to a ground coordinate system with respect to the four reference points specified. By way of perspective transformation, the detected objects will be mapped to the 2D top-down view. For the latter, video image frames will generally approximate a 2D plan view, although perspective transformation may still be required for high angle satellite imagery or wide area motion imagery captured from adapted aerial platforms.

Step 3. Vehicle information estimation and correction. Unlike roadway features (which can be deemed as 2D at the ground level), moving objects (e.g., vehicles) are 3D, the images of those objects are 2D projections to the camera view, which vary depending upon the object locations, the actual setup and configuration of the field camera(s) (e.g., location, height, pitch and yaw angles). To identify factual conflicts, the size of vehicles, especially length and width, must be accurately estimated and reflected on the 2D top-down view. To estimate the dimensions of any moving objects (e.g., vehicles) in the original images, a 3D mathematical model corresponding to the camera view is calibrated based on the camera mounting parameters (location [x, y], height [z], zoom, and pitch and yaw angles to replicate the camera view in the field. After calibration, the 3D model is used to estimate the "true" 2D dimensions of objects (e.g., the length and width of vehicles) in the top-down view. Because CCTV cameras are commonly pan-tilt-zoom capable, such 3D model allow for flexibility in tracking with different pan-tilt-zoom settings as long as the camera covers the targeted area of the site. After the dimensions of moving objects are estimated, they are represented as simple shapes (e.g., rectangles) in the 20 top-down view. This view transformation permits accurate capture of headways or gaps between moving objects (e.g., vehicles), which is critical for conflict event identification.

Figure 4:
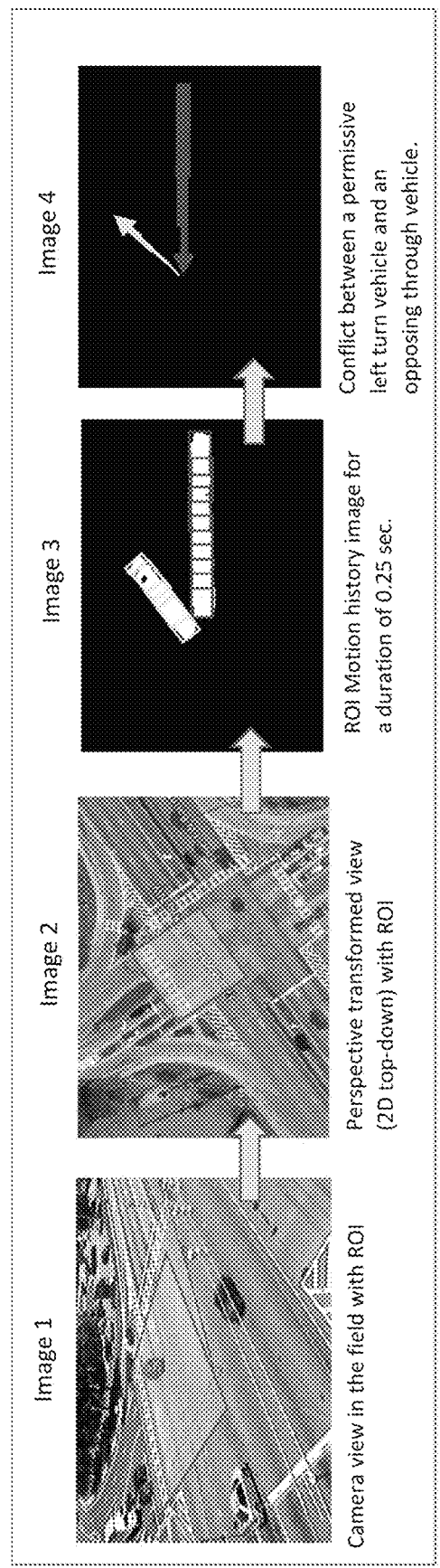
FIG. 4 shows a sequence of images representing the following: (image 1) an obtained video image frame with defined region of interest (highlighted field); (image 2) a transformed video image frame; (image 3) a motion history image showing the history of vehicle positions during the tracking time window); and (image 4) a corresponding symbolic image.

Step 4. Generation of symbolic images. Based on the 2D top-down view images, sequential motion history images for a properly defined time window (e.g., 0.6 seconds) is obtained by sliding the window one frame at a time. A motion history image shows the time sequence of moving objects (vehicles, bicycles, pedestrians, etc.) on a single image frame. An example of such an image is illustrated in FIG. 4 Image 3. The information contained in each motion history image is used to detect and classify conflict events.

Once the motion history image of moving objects are obtained, they are further reduced or simplified to retain only the necessary information in a pictorial or symbolic way. The actual trajectories of moving objects in a region of interest (ROI) can be constructed as consecutive line segments that connect the center of same vehicles in two successive image frames. The direction of movement may be indicated by an arrow or a circle. The width or thickness of each line segment may be drawn in proportion to its length. By plotting the line segment in this way, the system may provide a visual cue as to whether acceleration or deceleration occurs and to what degree. For example, if the sequence of line segments become thicker along the travel direction, an acceleration is justified. On the other hand, if line segments become thinner along the travel direction, a deceleration is effectual. The overall length of connected line segments in a motion history image implies an average speed over the targeted time window (e.g., 0.6 seconds). Additionally, the priority or order of movements may be indicated by predefined color, gray scale or patterns, in accordance with traffic control (right-of-way rules). An example of resulting symbolic images is illustrated in FIG. 4 Image 4.

The relative locations of moving objects over the targeted time window, the directions of travel (order of movements), speeds (frame by frame, or average), and acceleration/deceleration characteristics in the symbolic images contain information necessary for detecting and characterizing conflicts events (near-collision situations). By extracting those features from live video images and representing them in a symbolic way on a 2D top-down view, the dimension of original images can be significantly reduced to retain only key features of interest. At the same time, potential private information (e.g., vehicle tag number) is effectively removed for anonymity. To further reduce the dimension of images, several ROIs (see the example in FIG. 3) can be used to segment the images into different targeted areas of conflicts.

Figure 5:
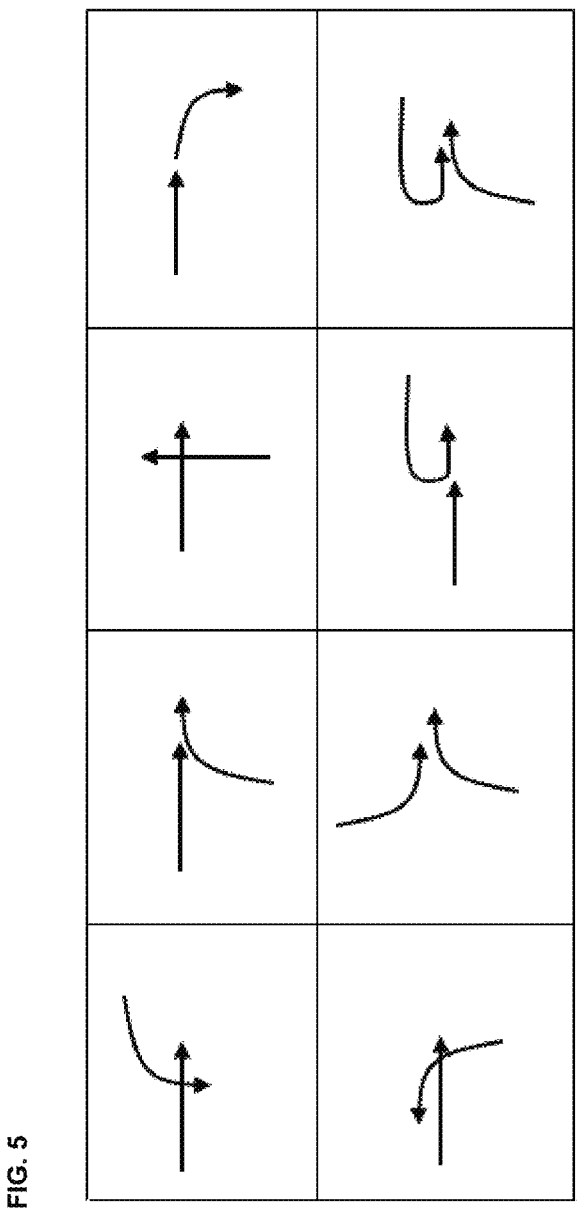
FIG. 5 shows common vehicle-vehicle conflict types at an intersection.
Figure 6:
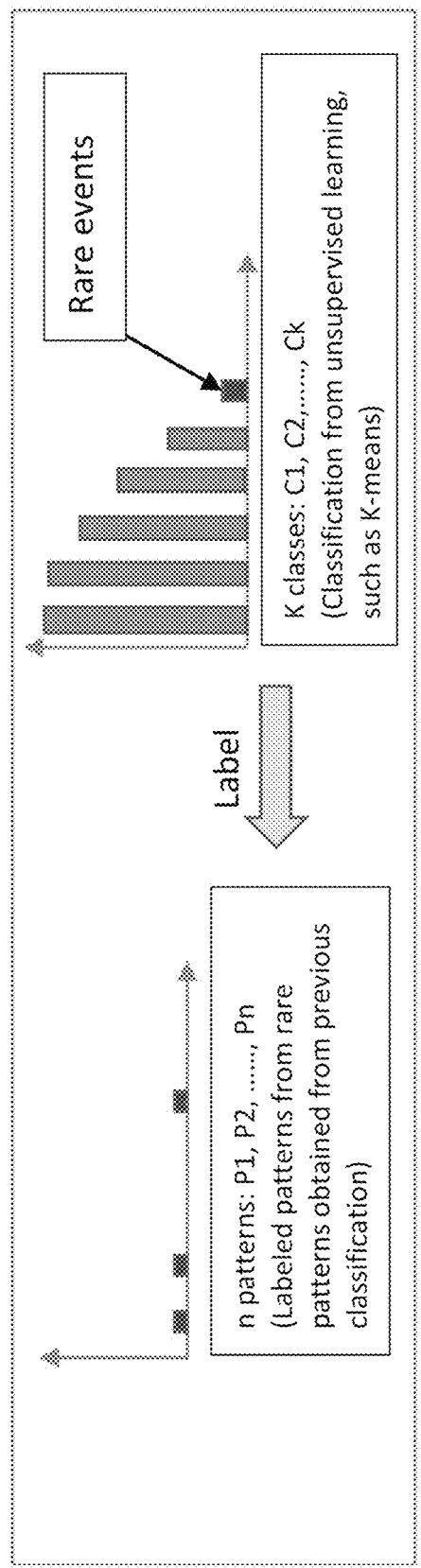
FIG. 6 is a schematic diagram showing the classification of symbolic images (right side) and extraction of "potential" conflict event patterns (left side).
Figure 7:
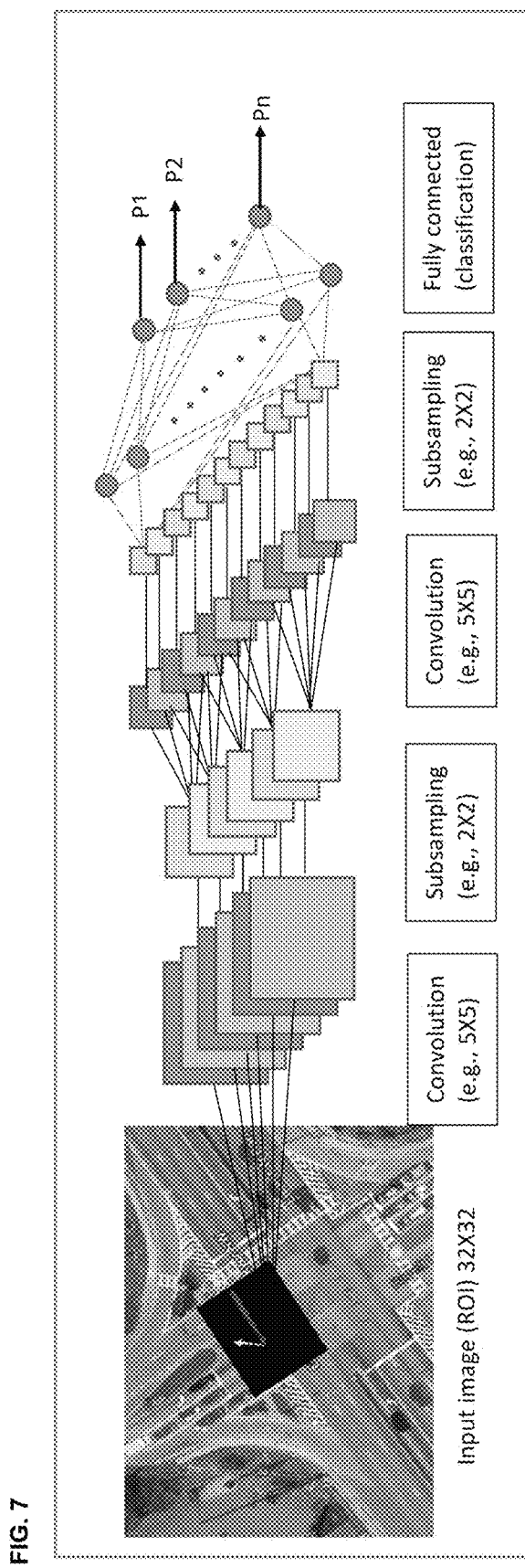
FIG. 7 is a representation of an exemplary Convolution Neural Network (CNN) that can be trained with a sequence of input images to detect and classify conflict events with classifications P1, P2 . . . Pn.
Figure 8:
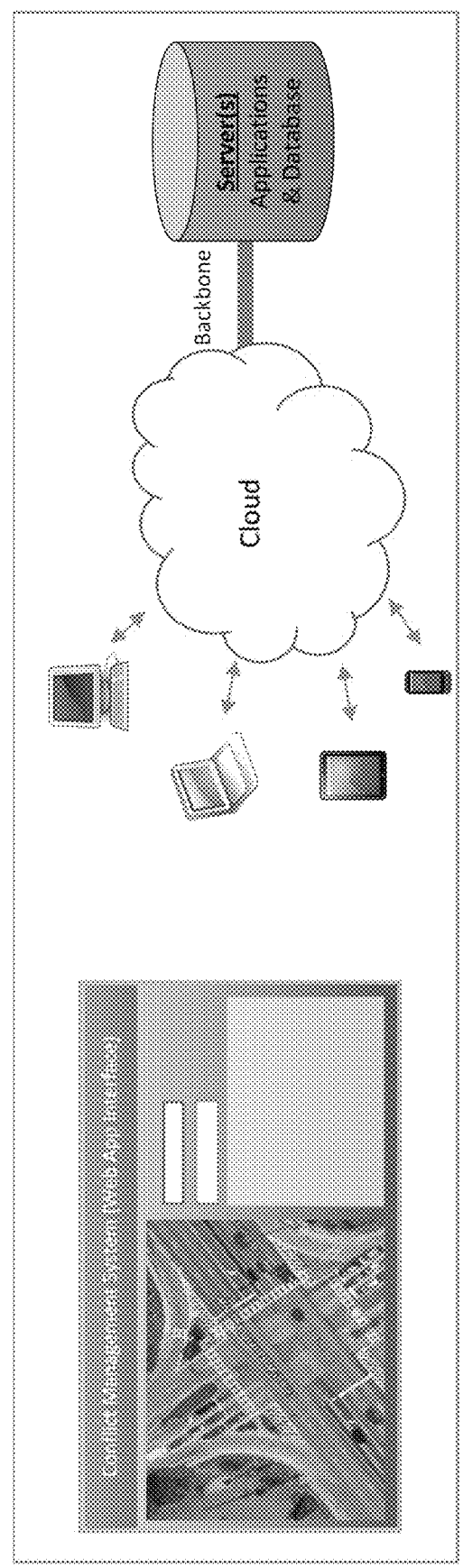
FIG. 8 depicts an exemplary web-based application interface to the system, which may be implemented using local servers, remote servers, or third party-hosted services (so-called "cloud" providers).

Step 5. Identification, classification, and labeling of symbolic images. After the symbolic images (Image 4 in FIG. 4) are generated, unsupervised learning algorithms (such as k-means) are used to classify the symbolic images (e.g., 100 patterns). Normal patterns are expected to occur more frequently on a daily basis, and therefore have a high frequency (probability) of occurrence. "Abnormal" patterns are rare and can be related to conflict events. As such, patterns with low frequency of occurrence may be extracted as representations of "potential" conflict events. The threshold for classifying "low frequency" may be determined from a random process based on an extreme value distribution. Heuristics may be employed to further screen legitimate conflict events. Those extracted "potential" conflict event patterns can then be verified as true conflicts and classified by type. FIG. 5 shows some vehicle-vehicle conflict types commonly seen at intersections. Verified and classified images are labeled and used to train and test Convolutional Neural Networks (CNN) models.

Step 6. Training and testing of CNN models. The labeled data from Step 5 is used to conduct supervised training of one or more CNN models for identification and classification of conflict events. Training may be conducted on a dedicated high-performance computing machine by using tested algorithms, such as the popular backward propagation algorithm, which adjusts network weights based on computed gradients to minimize an objective (loss) function. CNNs may be initially trained offline using large amounts of historical image data. After being successfully trained and tested, CNNs can be implemented for on-line conflict identification and classification in real time (given steps 1-5). To reflect any potential changes, such as human behavior, vehicle technologies, etc., CNNs can be retrained with newly acquired data.

Step 7. Optional storage with associated roadway and/or vehicle data. The classified conflict events may be stored in a database containing roadway characteristic data (i.e., number of lanes, approach curvature and grades, posted speeds, etc.), pavement condition data, traffic control data (i.e., pavement marking, signage, signals, etc.), environment data (e.g., weather and lighting conditions), and the like. It will be appreciated that many time-varying characteristics (such as pavement conditions and weather) can be extracted from live images as well. The conflict events identified by CNNs, together with the location, vehicle size, movement direction, speed, deceleration/acceleration, traffic signal operation data (if signalized intersections), and corresponding weather and pavement, may be logged in the database. This conflict event database may then be used to support intersection, corridor, or system-wide analyses for proactive traffic safety management.

The system consequently allows for a characterization and representation of true conflict events using "symbolic" features, extracted from live images of CCTV and vehicle detection cameras currently used by public agencies. The system identifies and classifies various conflict events in real time based on a deep-learning approach, allowing for automation of the collection of conflict event data in a continuous and systematic fashion. Thus, it may provide a basis for establishing an active intelligent traffic conflict monitoring and management system that does not currently exist. Such a conflict management system, if implemented, complements existing crash management systems for proactive road safety analysis and management.

The embodiments shown and described in the specification are only specific embodiments of inventors who are skilled in the art and are not limiting in any way. Thus, various changes, modifications, and/or alterations to those embodiments may be made without departing from the spirit of the invention or the scope of the following claims.

What is claimed is:

1. A device comprising one or more processors and memory storing instructions that, when executed by the one or more processors, cause the device to
   receive, from at least one camera device, first image data indicative of a roadway, where the first image data comprises a view of the roadway;
   generate, based at least on the first image data, second image data indicative of the roadway, where the second image data comprises a transformed view of the roadway;
   determine, based at least on the second image data, movement of an object relative to the roadway;
   determine, based at least on a parameter of the at least one camera device, dimensions of the object, wherein the determining the dimensions of the object comprises:
      generating, based at least on the parameter of the at least one camera device, a three-dimensional model of a view from the at least one camera device; and
      determining, using the three-dimensional model, the dimensions of the object
   determine, using the dimensions of the object, a timing of the movement of the object; and
   determine, based at least on the timing of the movement of the object, a conflict associated with the roadway.

2. The device of claim 1 where the view comprises a three-dimensional view of the roadway and the transformed view comprises a two-dimensional view of the roadway.

3. The device of claim 1 where generating the second image data comprises transforming the first image data to a ground coordinate system using a plurality of ground reference points.

4. The device of claim 1 where the parameter of the at least one camera device comprises at least one of a degree of distortion, a location, a zoom, a pitch angle, or a yaw angle of the at least one camera device.

5. A method for determining a probability of a conflict event associated with the moving object in traffic, the method comprising:
   receiving, by a computing device and from at least one camera device, image data indicative of traffic;
   determining, using image processing and the image data, a moving object of the traffic;
   determining, based at least on the image data and time data associated with the image data, a motion history of the moving object; and
   determining, based at least on the determined motion history of the moving object and a classification weight, a probability of a conflict event associated with the moving object.

6. The method of claim 5 where the determining the probability of the conflict event comprises using a convolutional neural network (CNN).

7. The method of claim 5 further comprising determining, based at least on the determined probability of the conflict event and using a backward propagation algorithm, an adjusted classification weight.

8. The method of claim 7 further comprising receiving live image data indicative of a roadway and determining, based at least on the live image data and using the adjusted classification weight, a current conflict event on the roadway.

9. The method of claim 5 where the determining the probability of the conflict event comprises determining a probability of each of a plurality of conflict events over a period of time; and where the method further comprises determining, based at least on the probability of the each of the plurality of conflict events, a potential conflict event.

10. The method of claim 5 where traffic is on a roadway and where the method further comprises modifying, based at least on the conflict event, at least one of a geometric feature of the roadway and a traffic control of the roadway.

11. A system comprising at least one camera device and a computing device in communication with the at least one camera device, where the computing device is configured to:
   receive, from the at least one camera device, video indicative of a roadway, where the video comprises a plurality of frames;
   determine, based at least on the video, a moving object on the roadway and a dimension of the moving object on the roadway;
   generate, based at least on a time associated with each of the plurality of frames and the dimension of the moving object, a symbolic representation of motion of the moving object; and
   determine, based at least on the symbolic representation, a conflict event associated with the moving object.

12. The system of claim 11 where the symbolic representation of the motion of the moving object is indicative of at least one of a direction, a traffic priority, a speed, an acceleration, or a deceleration of the moving object.

13. The system of claim 11 where determining the conflict event comprises:
   determining, using an unsupervised learning algorithm, a classification of each of a plurality of symbolic representations;
   determining, based on the classification of the each of the plurality of symbolic representations, a classification of the generated symbolic representation; and
   determining, based on the determined classification of the generated symbolic representation; the conflict event.

14. The system of claim 11 where the at least one camera device comprises at least one of a closed-circuit television camera, an aerial camera, a vehicle detection camera, or a camera coupled to a traffic signal.

15. The system of claim 11 where the determining the dimension of the moving object is further based at least on a transformation of the video from a perspective view of the roadway to a plan view of the roadway.

16. The system of claim 11 where the generating the symbolic representation of the motion of the moving object is further based at least on a calibration of the image data based at least on a parameter of the at least one camera device.

17. The system of claim 11 where generating the symbolic representation comprises generating, based on positions of one of the moving object in at least a subset of the plurality of frames, a line segment connecting the positions.

18. The system of claim 11 where the determining the conflict event is further based at least on at least one of a direction of travel, speed of travel, or acceleration or deceleration of travel of the moving object.

19. The system of claim 11 where the conflict event is associated with at least one of a collision or a collision avoidance behavior associated with the moving object.

* * * * *